United States Patent [19]

Tourtelot, Jr.

[11] 4,382,428
[45] May 10, 1983

[54] CONTOURED FINGER FOLLOWER VARIABLE VALVE TIMING MECHANISM

[76] Inventor: Edward M. Tourtelot, Jr., 2719 Sheridan Rd., Evanston, Ill. 60201

[21] Appl. No.: 271,680

[22] Filed: Jun. 8, 1981

[51] Int. Cl.³ .............................................. F01L 1/34
[52] U.S. Cl. .................................................. 123/90.16
[58] Field of Search ......................... 123/90.15, 90.16

[56] References Cited

U.S. PATENT DOCUMENTS

| | | | |
|---|---|---|---|
| 1,677,552 | 7/1928 | Diamant | 123/90.16 |
| 2,260,983 | 10/1981 | Walker | 123/90.16 |
| 2,934,052 | 4/1960 | Longenecker | 123/90.16 |
| 3,413,965 | 12/1968 | Gavasso | 123/90.16 |
| 4,205,634 | 6/1980 | Tourtelot, Jr. | 123/90.16 |

FOREIGN PATENT DOCUMENTS

| | | | |
|---|---|---|---|
| 104879 | 3/1918 | United Kingdom . | |
| 127628 | 6/1919 | United Kingdom . | |
| 362368 | 12/1931 | United Kingdom . | |
| 646404 | 11/1950 | United Kingdom | 123/90.16 |
| 737353 | 9/1955 | United Kingdom . | |
| 1496513 | 12/1977 | United Kingdom . | |

*Primary Examiner*—William A. Cuchlinski, Jr.
*Attorney, Agent, or Firm*—Merriam, Marshall & Bicknell

[57] ABSTRACT

A mechanism for varying the timing of the valves of an internal combustion engine wherein an elongated finger follower for each of the intake and/or each of the exhaust valves of the engine is disposed between and movable while engaged with the cams for the respective valves and linkage means that extends between the valves and the finger followers. The proximal ends of the followers are pivotally connected to the swingable ends of a plurality of cranks, the opposite ends of the cranks being connected to a control shaft that is mounted for limited rotational movement about an axis adjacent and parallel to the axis of rotation of the engine camshaft. Each finger follower has a convex surface engageable with the actuating linkage for its associated valve and a concave control surface engageable with the cam associated with a particular valve. The control surface includes contiguous portions of decreasing and increasing radius which coact with the opening and closing flank portions of the cam associated therewith to vary the timing of the valve in accordance with the position of the follower. The decreasing and increasing radius portions of the control surface are free of discontinuities so that the finger follower can shift between its limit positions without subjecting the components of the valve train to undesirable acceleration rates or shocks.

13 Claims, 17 Drawing Figures

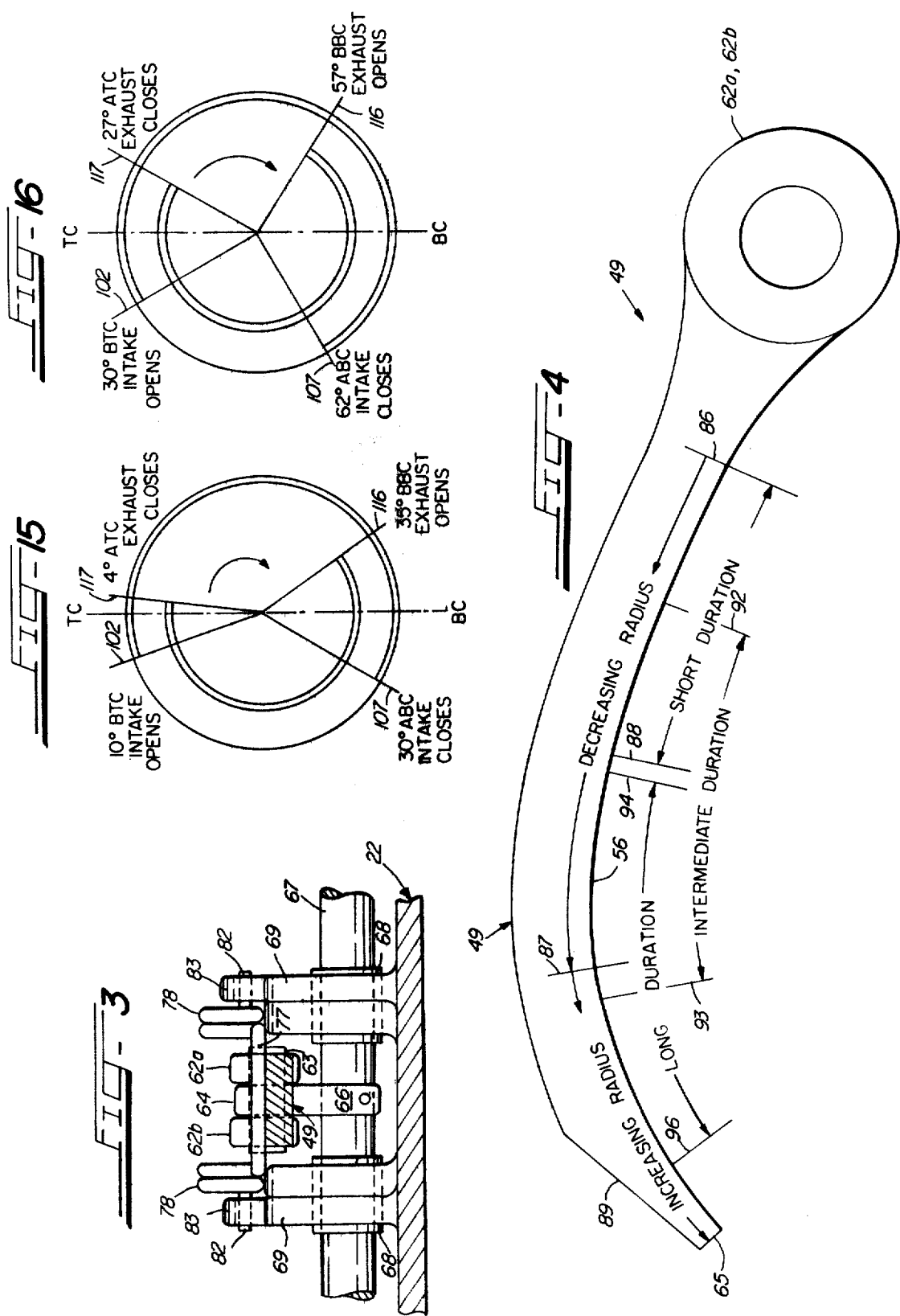

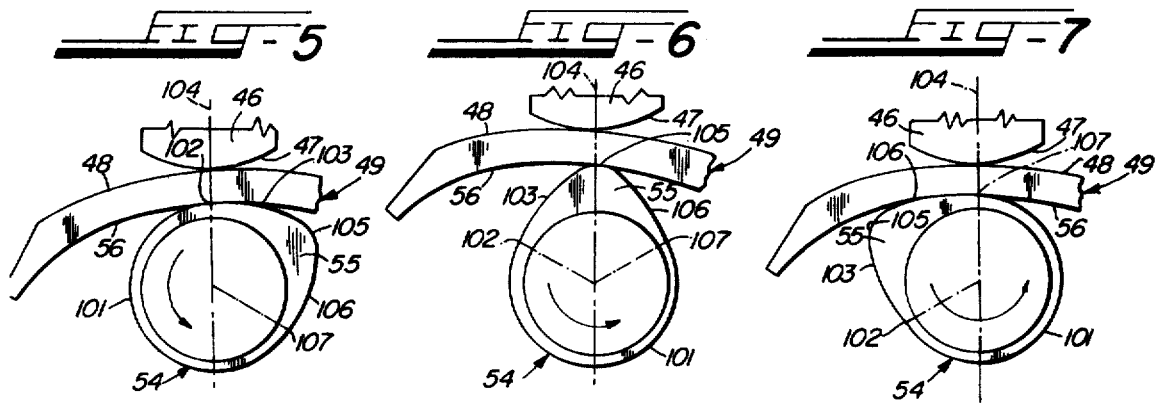
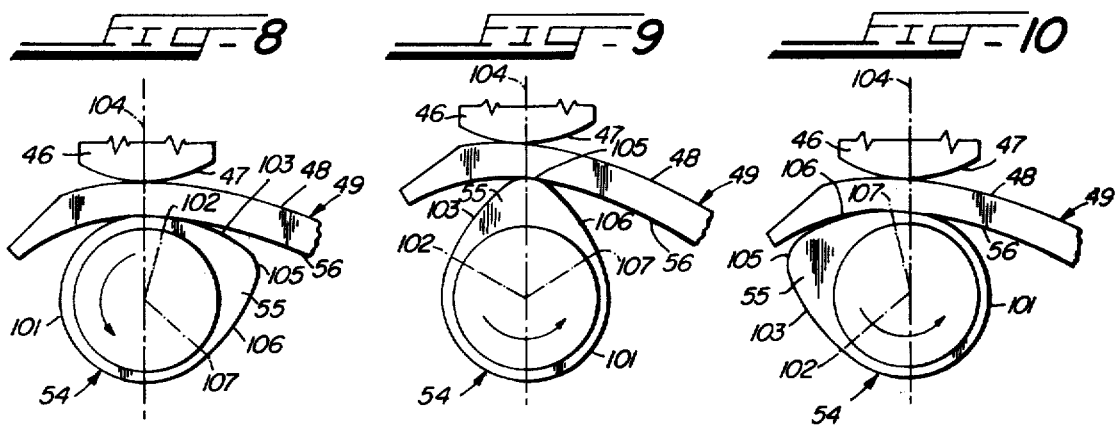
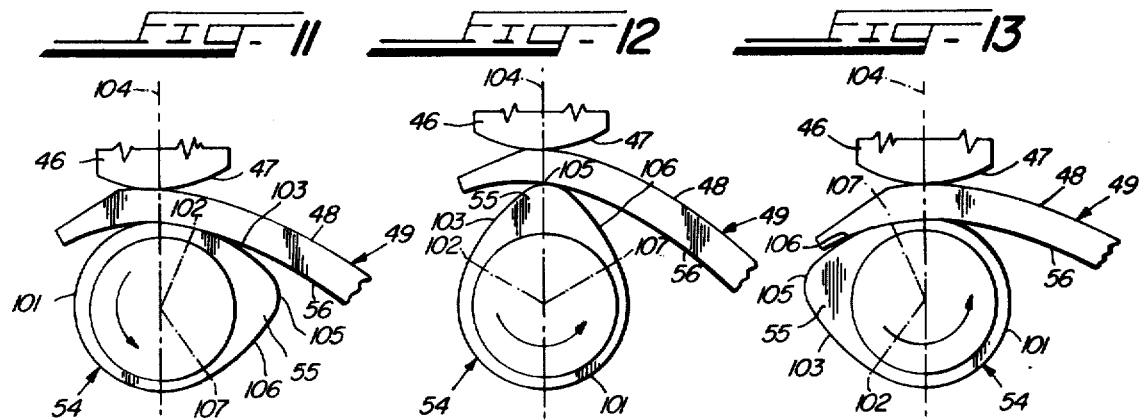

CONTOURED FINGER FOLLOWER VARIABLE VALVE TIMING MECHANISM

BACKGROUND OF THE INVENTION (1) Field of the Invention

This invention relates to a mechanism for actuating the valves of an internal combustion engine, and more particularly relates to a mechanism for varying the timing of the valves of an internal combustion engine in order to optimize the efficiency of the engine at different operating load and speed conditions.

(2) Description of the Prior Art

Various types of mechanisms and devices have been heretofore advanced for varying the timing of the intake and/or exhaust valves of internal combustion engines in order to improve the efficiency and performance of the engine when operating at different speeds and loads. One such mechanism is disclosed and claimed in my prior U.S. Pat. No. 4,205,634, granted June 3, 1980. This mechanism includes a rotatable camshaft having a plurality of conjugate or multi-element cam assemblies thereon, there being one assembly for at least each intake valve of the engine. Each conjugate cam assembly included an identical pair of axially spaced cams and a smaller and differently contoured cam positioned between the two axially spaced cams. The axially spaced cams were contoured to provide a timing for the associated valve such as would optimize the performance of the engine throughout one operating load and speed range, and the smaller cam was contoured to provide a different timing for the valve such as would optimize the performance of the engine throughout another operating load and speed range.

An elongated finger follower was positioned between each axially spaced pair of cams and was shiftable between a retracted position wherein the follower was out of contact with the central cam for all rotated positions thereof. Consequently, the timing of each valve was controlled solely by the axially spaced pair of cams. Each finger was also shiftable to an extended position wherein the finger engaged the central cam of its assembly throughout at least a portion of or for a complete revolution of the cam assembly. Consequently, the timing of the valve was controlled either by the axially spaced cams, or in part by the axially spaced pair of cams and the central cam, or solely by the central cam. Thus, different valve timings could be obtained for optimizing the power and efficiency of the engine for different speed and load conditions by extending or retracting each of the elongated fingers of the mechanism.

While the variable valve timing mechanism disclosed in my prior patent is capable of improving the efficiency and power output of an engine in which it is installed, during certain intermediate modes of operation and under certain conditions, undesirable acceleration rates of some of the components of the valve train could occur.

In addition to the variable valve timing mechanism disclosed in my prior patent, a control means for internal combustion engines is disclosed in the U.S. Pat. No. 2,260,983 to Walker, wherein the timing and lift of the valves of an engine could be changed by shifting a pair of parallel levers or followers in opposite directions to different positions between the tappets and lobes of multi-lobed cams. Each of the shiftable levers of the Walker control means included an operating surface having a planar surface portion and an adjoining, curved surface portion. The respective surface portions provided different points of opening and closing for the associated valves in accordance with the positions of the levers in relation to the lobes of the cams. The control means of the Walker patent was complicated and costly in that it required precise, simultaneous movement, in opposite directions, of the shiftable levers to effect a change in valve timing and could result in excessive rates of acceleration of the components of the structure due to the discontinuities at the junctions of the planar and curved surface portions of the levers.

A mechanism for varying the timing of the valves of an interal combustion engine is also disclosed in the U.S. Pat. No. 2,934,052 to Longenecker, wherein an arcuately-shaped cam follower was positioned between a pair of cams for each intake and exhaust valve of the engine, the followers being operable to transmit movement from one or the other of the associated cams to the associated valve. Each follower was provided with recesses at longitudinally spaced positions therealong to accommodate passage of the lobes of one or the other of the cams without transmitting movement to the valve. In addition, each follower was arcuately shiftable to permit selective operation of one or the other of the cams for each valve. The Longenecker mechanism was incapable of providing a valve timing other than could be obtained from the two cams, was complicated, and likewise could result in excessive rates of acceleration of the components of the mechanism.

A mechanism for changing the timing and lift of the valves of an internal combustion engine is disclosed in the U.S. Pat. No. 3,413,965 to Gavasso, which utilized a pivotally mounted lever interposed between the valve actuating rocker arm and an eccentric or cam on a rotatable shaft such that the point of engagement of the lever with the upper surface of the rocker arm could be varied during rocking movement thereof. Such rocking movement was accomplished by a push rod, one end of which engaged the rocker arm and the other end of which rode on a cam on the camshaft of the engine. The valve timing adjusting mechanism disclosed in the Gavasso patent was complex in construction, noisy, resulted in a slower than desirable valve action, and was susceptible to the development of excessive lash in the components thereof.

SUMMARY OF THE INVENTION

Briefly described, the present invention contemplates a novel mechanism for varying the timing of the valves of an internal combustion engine to improve the efficiency of the engine for different speed and load conditions. The mechanism is thus adapted for use with an engine having one or more valves for controlling the flow of gaseous fluid into and out of the combustion chamber or chambers of the engine, and linkage means for transmitting movement to the valves. The mechanism, to be hereinafter described in detail, thus includes a rotatable camshaft having a plurality of cam members thereon, one for each of the valves, linkage means connected to the valves for effecting movement thereof, and follower means in the form of a plurality of elongated members or fingers having upper and lower, non-planar surfaces, respectively engaging the cam members and linkage means. The mechanism also includes operating means connected to the proximal ends of the fingers for shifting the latter relative to the cam members and linkage means while the fingers are engaged therewith in order to vary the timing and duration of the open period of the valves and thus optimize the performance and efficiency of the engine for different speed and load conditions.

As will be described in greater detail hereinafter, the surface of each finger that engages its associated cam member is concave and comprises a control surface while the nonplanar surface that engages the linkage means is convex, both surfaces including contiguous portions of decreasing and increasing radius. The aforementioned operating means includes a rotatable shaft and a plurality of cranks interconnecting the shaft and the proximal ends of the respective fingers, each crank being effective to shift the proximal end of the finger associated therewith in an arcuate path and throughout a range of positions to bring different portions of the concave control surface of the finger into engagement with the cam in accordance with changing load and speed conditions of the engine.

BRIEF DESCRIPTION OF THE DRAWINGS

FIG. 3 is a fragmentary, vertical sectional view taken substantially along the line 3—3 of FIG. 1;

FIG.4 is an enlarged, side elevational view of the contoured finger follower of the variable valve timing mechanism of the present invention, the portions of the upper and lower surfaces of the finger of increasing and decreasing radius, and the sections of the portions that provide short, intermediate and long duration of the open period of the associated valve, being identified by legend;

FIGS. 5-7, inclusive, 8-10, inclusive, and 11-13, inclusive, are a series of semi-diagrammatic, fragmentary, vertical sectional views of one of the cams and finger followers of the variable valve timing mechanism of the present invention, and showing the variation of the points of engagement between the cam and finger in response to changes in the position of the finger with respect to the cam and adjacent surface on the end of the rocker arm;

FIG. 15 is a diagram showing the timing of the intake and exhaust valves for one of the cylinders of an engine incorporating the variable valve timing mechanism of the present invention when the latter is operating to provide optimum valve timing for a low speed, moderate to heavy load condition of the engine;

FIG. 16 is a valve timing diagram showing the timing of the intake and exhaust valves for one of the cylinders of an engine embodying the variable valve timing mechanism of the present invention when the latter is operating to provide optimum timing of the intake and exhaust valves for a high speed, light to moderate load condition of the engine.

DESCRIPTION OF THE PREFERRED EMBODIMENTS

Figure 1:
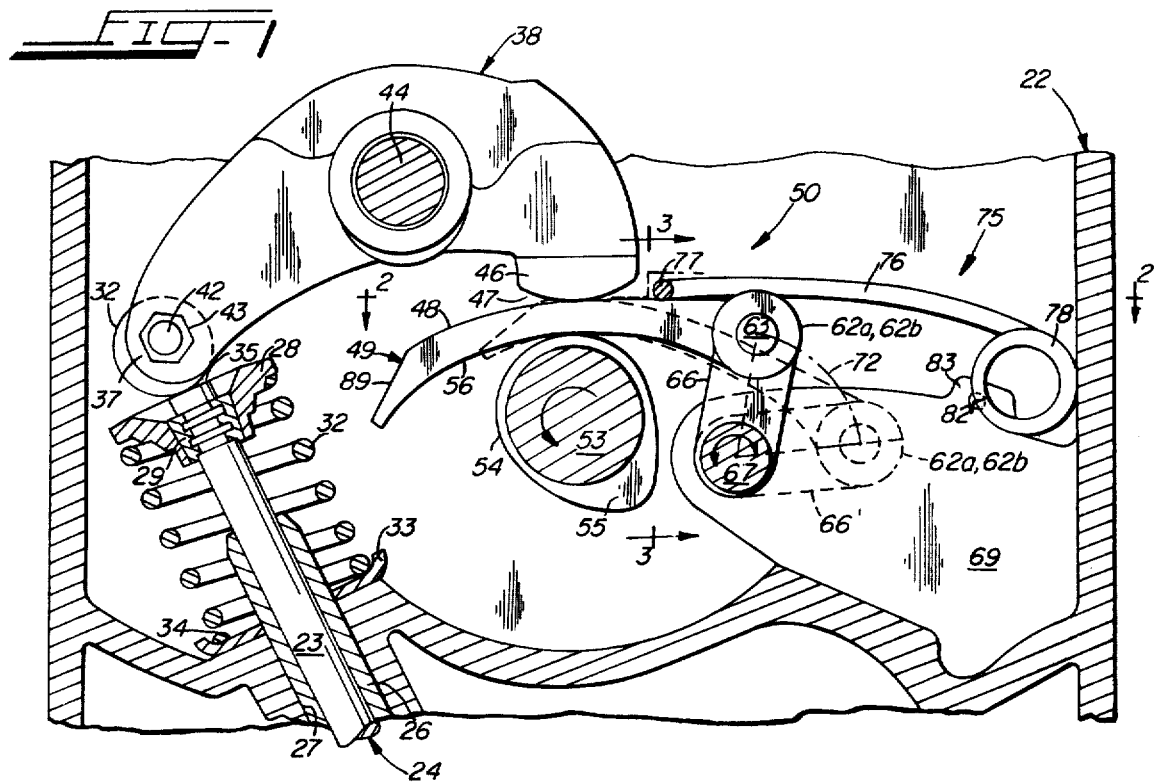
FIG. 1 is a fragmentary, vertical sectional view, with some parts in elevation, of a portion of the cylinder head of an internal combustion engine and showing a portion of one of the valves thereof and a rocker arm for actuating the valve, the engine incorporating a mechanism embodying the features of the present invention for varying the timing of the valve.

In FIG. 1, a portion of the cylinder head, indicated at 22, of a multicylinder, internal combustion engine is illustrated. The engine includes a cylinder block (not shown) having a plurality of cylinders (also not shown) therein and a plurality of pistons (likewise not shown) reciprocably mounted in the cylinders.

The cylinder head 22 includes intake and exhaust passages for each cylinder, and at least one intake and at least one exhaust valve for controlling gaseous fluid flow through the intake and exhaust passages, respectively. As illustrated in FIG. 1, only the stem, indicated at 23, of one of the intake valves 24 of the engine is illustrated, the stem being shiftably mounted in a guide 26 which is mounted in a bore 27 in the cylinder head 22. A spring retainer 28 is secured to the upper end of the valve stem 23 by a tapered, split keeper 29, the retainer 28 providing a seat for the upper coil of a valve spring 32. The lower coil of the spring 32 engages a cup-shaped seat 33 which surrounds the guide 26 and engages a flat surface 34 on the cylinder head 22. The valve 24 also includes a head (not shown) for opening and closing the intake passage for the associated cylinder.

The upper end, indicated at 35, of the valve 24 engages a wheel-type lash adjuster 36 which is eccentrically mounted in one end 37 of a rocker arm 38 as by an eccentric shaft 42 and which is retained in an adjusted position by a lock nut 43.

The rocker amr 38 is rockably mounted on a shaft 44 supported at various points on the cylinder head 22 of the engine. The opposite end 46 of the rocker arm 38, preferably has a convex undersurface 47 that is adapted to engage a nonplanar, convex surface 48, on the upper side, as viewed in FIG. 1, of follower means in the form of an elongated member or finger 49. The finger follower 49 forms part of a mechanism, indicated generally at 50, for varying the timing of the valve 24 with respect to the operating cycle of the associated cylinder in order to improve the power output and efficiency of the engine throughout different engine load and speed conditions, and also to reduce the level of emission of undesirable pollutants from the engine. The details of the construction and operation of the finger 49 will be described more fully hereinafter.

Figure 2:
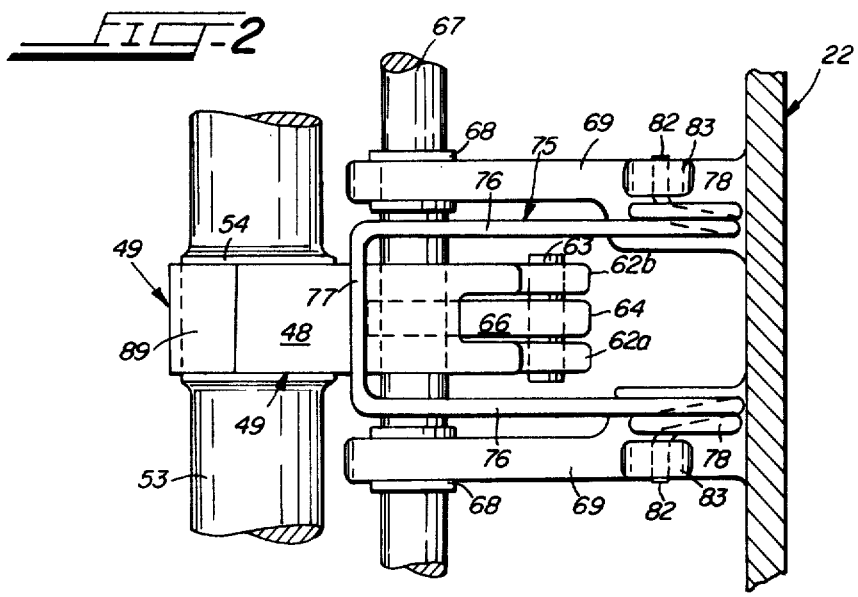
FIG. 2 is a fragmentary, horizontal sectional view taken substantially along the line 2—2 of FIG. 1.

Referring now to FIGS. 2 and 3 in conjunction with FIG. 1, it will be seen that the mechanism 50 includes a camshaft 53 having at least one and preferably a plurality of cam members thereon, one of which is indicated at 54 and adapted to engage a nonplanar, concave control surface, indicated at 56, on the underside of the finger 49. The camshaft 53 extends lengthwise of the cylinder head of the engine and has its axis of rotation perpendicular to that of the axis of the valve stem 23. It will be understood that at least one cam member 54 is provided on the camshaft 53 for each intake valve of the engine, and another series of cams (not shown) are provided on the camshaft 53, or on another camshaft, for each exhaust valve of the engine. The camshaft 53 is driven by the crankshaft (not shown) of the engine by means, such as gears or a chain (also not shown) at some ratio to the speed of rotation of the engine crankshaft.

As will be apparent from FIGS. 2 and 3, the proximal end of the finger 49 is bifurcated so as to include a pair of spaced portions 62a and 62b, which are transversely, line-bored to receive a pivot pin 63. The pin 63 also extends through an opening in one end, indicated at 64, of a crank 66. The opposite end of the crank 66 is connected to another or control shaft 67, which extends lengthwise of the cylinder head 22 of the engine and which is supported in suitable bearings 68 mounted in pairs of spaced flanges 69 along the length of the shaft so that the axis of the shaft 67 extends substantially parallel to that of the camshaft 53. In addition, and as will be apparent from FIG. 1, the control shaft 67 is disposed on the side of the camshaft 53 opposite from the valve 24 and somewhat below a horizontal plane through the axis of the camshaft 53. The shaft 67 and crank 66 thus comprise operating means for effecting movement of the finger follower 49 through movement of the proximal end 62a,62b thereof.

With the foregoing location of the control shaft 67, the proximal end 62a,62b of the finger 49 will follow an arcuate path, indicated at 72 in FIG. 1, and the finger will oscillate between its full and broken line limit positions illustrated in FIG. 1. The crank 66 moves through an angle of approximately 75°. The effect of the arcuate path of movement of the proximal end 62a,62b of the finger 49 with respect to the operation of the mechanisn 50 will be described in more detail hereinafter.

In order to maintain contact between the concave control surface 56 of the finger 49 and the cam 54, spring means is provided. Such spring means is indicated generally at 75 in FIGS. 1, 2 and 3, and comprises a "mousetrap"-type spring, which is generally U-shaped and includes a pair of spaced, parallel legs 76 and a connecting portion 77 which extends perpendicularly to the legs and which is adapted to engage the upper surface 48 of the finger 49. The ends of the legs 76, remote from the connecting portion 77, are formed with one or more helical coils 78, which terminate in transversely outwardly directed ends 82 that are pivotally received in bosses 83 formed integrally with spaced flanges 79 on the cylinder head 22.

Referring now to FIG. 4, the portions of the concave, lower control surface 56 and convex, upper surface 48, as viewed in FIG. 4, of the finger follower 49, which coact with the cam 54 and convex surface 47 of the end 46 of the rocker arm 38 and which serve to vary the period during which the valve remains open to improve the operating efficiency of the engine for different speed and load conditions, will now be described. As shown in FIG. 4, the concave lower surface 56 and convex upper surface 48 each includes a portion of decreasing radius, which extends between the lines 86 and 87, and a portion of increasing radius which extends between the line 87 and the distal end 65 of the finger 49. The thickness of the finger follower 49 is substantially uniform between the portions of decreasing and increasing radius, except for a beveled section 89 adjacent to the distal end 65 of the finger. In addition, the sections of the control surface 56 of the finger 49 which provide open periods of "short, intermediate, and long duration" of the valve 24, are indicated by legend in FIG. 4.

Thus, with reference to FIG. 4, the "short duration" section of the lower, concave surface 56 includes that part of the surface 56 between the line 86 and a line 88.

The "intermediate duration" section of the surface 56 includes that part of the surface 56 between a line 92 and another line 93. The "intermediate duration" section thus includes a substantial part of decreasing radius portion of the surface 56 of the finger 49 and a small part of the increasing radius portion of the surface 56.

The "long duration" section of the surface 56 includes that part of the surface 56 between a line 94 and another line 96. The "long duration" section thus includes approximately equal parts of the decreasing and increasing radius portions of the concave surface 56 of the finger.

Referring to FIGS. 5-13, inclusive, 14, 15 and 16, the manner in which the cam 54 and finger follower 49 of the mechanism 50 coact to vary the timing of the valve 24 for three different operating conditions of the engine will now be described. It should be understood, however, that the contour of the lower surface 47 of the end 46 of the rocker arm 38, as well as the contours of the concave and convex surfaces 56 and 48, respectively, of the finger follower 49 are somewhat diagrammatically shown in FIGS. 5-7, inclusive, 8-10, inclusive, and 11-13, inclusive, for the purpose of illustrating the principles of operation of the invention and not to illustrate a working embodiment. It should also be understood that, in the following description, the angles that will be referred to in FIGS. 5-7, inclusive, 8-10, inclusive, and 11-13, inclusive, are in degrees of camshaft rotation, while the angles that will be referred to on the timing diagrams of FIGS. 15 and 16 are in degrees of crankshaft rotation. It should further be understood that the angles to be discussed hereinafter in connection with the diagrams illustrated in FIGS. 5-7, inclusive, 8-10, inclusive, 11-13, inclusive, 15 and 16 are merely exemplarly for the purposes of understanding the principles of the present invention.

Assuming that the engine of the vehicle in which the mechanism 50 is installed is going to be operated at a relatively low speed and under a moderate to heavy load condition, the control shaft 67 of the mechanism 50 will either be manually or automatically rotated to a position such that the fingers 49 for each of the intake valves 24 of the engine will approximately occupy the positions thereof illustrated in full lines in FIGS. 1 and 5. When so positioned, the "short" duration section of the control surface 56 of the finger 49 will be positioned between the cam 54 and convex surface 47 of the end 46 of the rocker arm 38. In FIG. 5, the base circle portion of the cam 54 is indicated at 101, the opening ramp portion of the cam lobe 55 is indicated at 102, and the opening flank portion of the lobe is indicated at 103. It will be assumed that all of the lash in the linkage between the cam and valve 24 has been taken up at the point 102 so that the valve begins to lift at this point. This point is also approximately indicated by the point 102 on the solid line curve 100 of the valve lift-degree diagram of FIG. 14 and by the line 102 on the valve timing diagram of FIG. 15. When the finger 49 is in the position thereof shown in FIG. 5, the point 102 also lies on a reference line 104, which, for the purpose of the following description, is shown as a vertical line and will be assumed to extend through the axis of the camshaft 53 and substantially through the point of maximum convexity of the end 46 of the rocker arm 38.

As the cam 54 continues to rotate counterclockwise from the position thereof illustrated in FIG. 5 toward the position thereof illustrated in FIG. 6, the opening flank portion 103 pivots the finger 49 upwardly about the axis of the pin 63. Consequently, the upper surface 48 of the finger, acting against the convex undersurface 47 of the end 46 of the rocker arm 38, causes the rocker arm to pivot counterclockwise about its shaft 44, as viewed in FIG. 1. The opposite end 37 of the rocker arm thus shifts the valve stem 23 downwardly in its guide 26 to open the valve. Such movement continues until the high point, indicated at 105, of the cam lobe 55 engages the undersurface 56 of the finger 49, as illustrated in FIG. 6. When the parts of the mechanism 50 are in the positions thereof illustrated in FIG. 6, the valve 24 is in its maximum lift position. Such point is indicated at 100' on the curve 100 of the valve lift-degree diagram of FIG. 14. The approximate amount of lift of the valve 24 when the crank 66 is in its full line position illustrated in FIG. 1, is illustrated by the curve 100 in FIG. 14.

As the cam 54 continues to rotate counterclockwise from the position thereof illustrated in FIG. 6 to the position thereof illustrated in FIG. 7, the undersurface 56 of the finger 49 follows the closing flank portion, indicated at 106, of the lobe 55 as does the end 46 of the rocker arm 38 until the closing ramp portion, indicated at 107, merges with the base circle 101 of the cam. At this time, the point 107 coincides with the reference line 104. It will be assumed that the valve 24 seats when the point 107 coincides with the reference line 104, and remains seated while the cam continues its counterclockwise rotation with the base circle 101 engaged with the finger 49. The point 107 is also indicated on the valve lift-degree diagram of FIG. 14 and by the line 107 on the valve timing diagram of FIG. 15. Thus, with the finger 49 in its fully extended position illustrated in FIGS. 5, 6 and 7, the period during which the intake valve 24 remains open is about 220° of crankshaft rotation.

Referring now to FIGS. 8, 9 and 10, inclusive, the relative positions of the finger 49 with respect to the cam 54 and undersurface 47 of the rocker arm 38 are approximately shown as they would appear during the working portion of one revolution of the cam 54 when the crank 66 of the mechanism 50 is in an intermediate position between its full and broken line positions illustrated in FIG. 1. Thus, FIGS. 8, 9 and 10 illustrate the positions of the parts of the mechanism 50 when the engine is operating at an intermediate speed and load condition. Under these conditions, the intermediate duration section (FIG. 4) of the undersurface 56 of the finger 49 coacts with the cam 54 to increase the duration of the open period of the valve, as illustrated by the dot-dash curve 112 in the valve lift-degree diagram of FIG. 14.

Thus, when the finger 49 is positioned so that the abovementioned "intermediate duration" section is operable, the opening ramp point 102 will contact the undersurface 56 of the finger and begin to effect opening movement of the valve 24 earlier than when the finger 49 is in its fully extended position illustrated in FIGS. 5-7, inclusive. Such earlier opening is primarily due to the fact that the opening flank portion 103 of the cam lobe 55 engages parts of the finger 49 having a smaller radius of curvature than when the finger is in its fully extended position. The earlier opening is also due, in part, to the slightly greater downward inclination of the proximal end 62a,62b of the finger. It will be assumed that when the mechanism 50 incorporates a finger and cam having the relative dimensions and contours as the finger 49 and cam 54, the opening flank portion 103 of the lobe 55 begins to lift the valve 24 approximately 7½ camshaft and 15 crankshaft degrees earlier than when the finger 49 is in its extended position illustrated in FIGS. 5, 6 and 7.

In FIG. 9, the high point 105 of the cam lobe 55 is shown engaged with the undersurface 56 of the finger 49 so that the valve 24 is at maximum lift. The point 112' on the curve 112 of the valve lift-degree diagram illustrated in FIG. 14 corresponds to this position of the cam 54 and finger 49.

FIG. 10 illustrates the position of the parts of the mechanism 50 when the closing ramp point 107 has just moved out of engagement with the undersurface 56 of the finger. Such later closing of the valve 24 is primarily due to the fact that the closing ramp portion 107 of the lobe 55 engages parts of the finger 49 having a smaller radius of curvature than when the finger is in its fully extended position. It will be assumed that the profile of the closing flank portion 106 and the contour of the decreasing radius section of the undersurface 56 of the finger 49 results in the intake valve 24 closing approximately 7½ camshaft and 15 crankshaft degrees later than it does when the finger 49 is in its extended position illustrated in FIG. 7.

Figure 14:
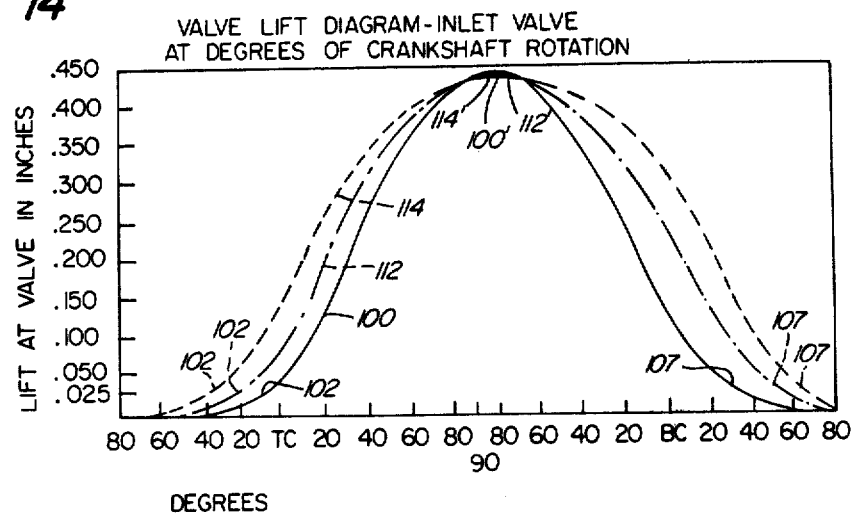
FIG. 14 is a diagram of valve lift plotted against degrees of crankshaft rotation of an engine incorporating the variable valve timing mechanism of the present invention and showing the changes in the duration of the open period of the valve for three of the different obtainable operating conditions of the engine.

Referring now to FIG. 1 in conjunction with FIGS. 11-13, inclusive, 14 and 16, the relative positions of the finger follower 49 with respect to the cam 54 and the undersurface 47 of the rocker arm 38 are approximately shown as they would appear during the working portion of one revolution of the cam when the crank 66 is in its fully retracted, broken line position illustrated in FIG. 1 so that the "long duration" section (FIG. 4) of the undersurface 56 of the finger 49 is in position to coact with the cam lobe 55 to increase the duration of the open period of the valve 24 as illustrated by the broken line curve 114 in the valve lift-degree diagram shown in FIG. 14.

Thus when the finger 49 is in its "long duration" position, the opening ramp point 102 on the cam 54 will contact the undersurface 56 of the finger and the opening flank portion 103 will begin to effect opening movement of the valve earlier than when the finger 49 is in its "intermediate duration" position, or in its fully extended position illustrated in FIGS. 5-7, inclusive. Such earlier opening is primarily due to the fact that the opening flank portion 103 of the cam lobe 55 engages the parts of the finger 49 having substantially the smallest radius of curvature. The earlier opening is also due, in part, to the greater downward inclination of the proximal end 62a,62b of the finger from the position thereof illustrated in FIG. 8. It will be assumed that when the finger 49 is in its fully retracted position illustrated at 49' in FIGS. 1 and 11-13, inclusive, the opening flank portion 103 of the lobe 55 begins to effect lift of the valve approximately 7½ camshaft and 15 crankshaft degrees earlier than it would when the finger 49 is in its "intermediate duration" position illustrated in FIGS. 8-10, inclusive, and approximately 15 camshaft and 30 crankshaft degrees earlier than it would when the finger 49 is in its extended position illustrated in FIGS. 5-7, inclusive. This point is also approximately indicated by the point 102 on the curve 114 of the valve lift-degree diagram of FIG. 14 and also by the line 102 on the valve timing diagram of FIG. 16.

In FIG. 12, the high point 105 of the lobe 55 is shown engaged with the undersurface 56 of the finger 49 so that the valve 24 is at maximum lift. The point 114' on the curve 114 of the valve lift-degree diagram of FIG. 14 identifies the maximum lift position of the valve 24.

As the cam 54 continues to rotate counterclockwise from the position thereof illustrated in FIG. 12 toward the position thereof illustrated in FIG. 13, the undersurface 56 of the finger 49 follows the closing flank portion 106 of the cam, until the closing ramp point 107 moves out of engagement with the undersurface 56 of the finger 49. As will be apparent from FIG. 13, the point 107 remains in contact with the undersurface 56 of the finger 49 for a greater portion of the working cycle of the cam 54 than when the finger is in its "intermediate duration" position illustrated in FIGS. 8-10, inclusive, and its fully extended, "short duration" position illustrated in FIGS. 5-7, inclusive. Such longer, open duration period of the valve 24 is due to the coaction between the profile of the opening and closing flank portions 103 and 106 of the cam lobe 55 and the contour of the control surface 56 of the finger 49, and also because of the fact that the opening and closing flank portions 103 and 106 remain engaged with the control surface 56 for a greater period of time than when the finger 49 is in the position thereof illustrated in FIGS. 5-7, inclusive, and 8-10, inclusive. The point as which the valve 24 seats is indicated at 107 on the valve lift-degree diagram of FIG. 14 and by the line 107 on the valve timing diagram of FIG. 16.

It will be assumed that the profile of the closing flank portion 106 of the cam 54 and the contour of the undersurface 56 of the finger 49 is such as to cause the intake valve 24 to close approximately 7½ camshaft and 15 crankshaft degrees later than it would when the finger 49 is in its intermediate position illustrated in FIG. 10 and approximately 15 camshaft and 30 crankshaft degrees later than it would when the finger 49 is in its fully extended position illustrated in FIG. 7. Thus, when the finger 49 in its fully retracted position illustrated in broken lines in FIG. 1 and in full lines in FIGS. 11-13, inclusive, the duration of the period during which the intake valve 24 remains open is about 272° of crankshaft rotation. Consequently, the duration of the periods during which each of the intake valves of an engine having mechanisms, such as the mechanism 50, remain open can be varied, for example, from about 220 to about 272 degrees of crankshaft rotation.

The mechanism 50 may also be used to vary the timing of the exhaust valves of an internal combustion engine, in addition to the intake valves. Thus, the valve timing diagrams of FIGS. 15 and 16 include the lines 116 and 117, which respectively represent the times, in terms of degrees of crankshaft rotation, at which the exhaust valves of an engine equipped with mechanisms embodying the features of the mechanism 50 open and close. The lines 116 and 117 in FIG. 15 thus illustrate an exemplary optimum timing of the exhaust valves when the engine is operating under a slow speed, moderate to heavy load condition, and the lines 116 and 117 in FIG. 16 illustrate an exemplary optimum timing of the exhaust valves when the engine is operating under a high speed, moderate to light load condition. The duration of the open period of the exhaust valves provided by the timing illustrated in FIG. 15 is approximately 219 degrees of crankshaft rotation and the duration of the open period of the exhaust valves provided by the timing illustrated in FIG. 16 is approximately 264 degrees of crankshaft rotation.

Figure 17:
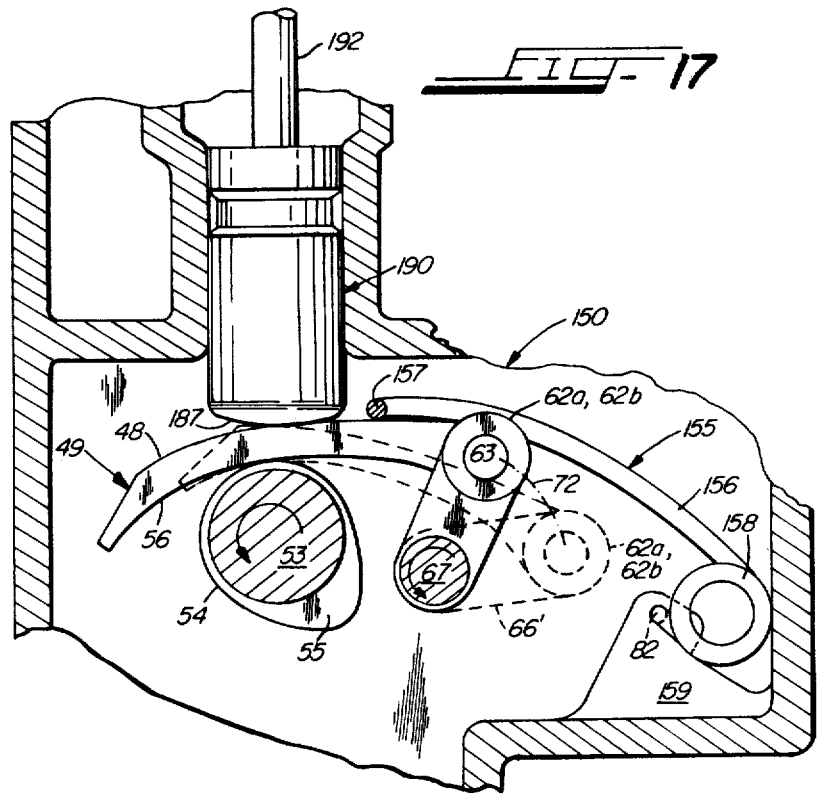
FIG. 17 is a fragmentary, vertical sectional view of a portion of another internal combustion engine utilizing push rods for effecting movement of the valve actuating rocker arms thereof and showing the relationship of the components of the variable valve timing mechanism of the present invention when associated with this type of engine.

Referring now to FIG. 17, another variable valve timing mechanism, embodying the features of the present invention and indicated generally at 150, is illustrated in connection with an engine in which push rods are employed to transmit movement from the camshaft of the engine to the rocker arms, instead of directly from the rocker arms, as in the arrangement illustrated in FIG. 1. Only the lower portion of the engine in which the mechanism 150 is installed is illustrated in FIG. 17. Since the variable valve timing mechanism 150 employs many components identical with those of the mechanism 50, like reference numerals have been used to identify identical parts.

The mechanism 150 differs from the mechanism 50 primarily in the construction of the "mousetrap"-type spring, indicated generally at 155, which serves to maintain contact between the concave undersurface 56 of the finger 49 of the mechanism 150 and the cam 54 thereof. The spring 155 is similar to the spring 75 of the mechanism 50 in that it is also generally U-shaped and includes a pair of spaced, parallel legs 156 and a connecting portion 157 which extends perpendicularly to the legs 156 and which is adapted to engage the upper surface 48 of its associated finger 49. The legs 156 of the spring 155 differ from the legs 76 of the spring 75 in that the former are bowed upwardly to a greater extent than are the legs 76, and the coils, indicated at 158, at the pivot ends of the legs 156 are positioned lower than the coils 78 of the spring 75 and are carried by smaller flanges 159 than the flanges 69.

In addition, the upper convex surface 48 of the finger engages the lower, somewhat convex surface, indicated at 187, of a valve lifter 190, instead of one end of a rocker arm. In the present instance, a push rod 192 connects the valve lifter 190 with the rocker arm (not shown).

The other parts of the mechanism 150 are identical with those of the mechanism 50. Consequently, reference should be made in this specification to the description of the construction and operation of the mechanism 50 for an understanding of the construction and operation of the mechanism 150.

The variable valve timing mechanism 50 and 150 have been herein described in conjunction with internal combustion engines which utilize rocker arms to open the intake and exhaust valves, the finger followers of the mechanisms either acting directly on one end of the rocker arms or indirectly through push rods. It is also contemplated that the mechanism 50 of the present invention could be utilized to advantage in engines which employ double overhead camshafts to open the intake and exhaust valves.

While one or more embodiments of the invention have been herein illustrated and described, it will be understood that modifications and variations thereof may be developed which do not depart from the spirit of the invention and the scope of the appended claims.

I claim:

1. Mechanism for varying the time at which a valve for controlling the flow of fluid into or out of a combustion chamber of an internal combustion engine opens and closes, said combustion chamber being defined by a cylinder in the engine and a piston movable in the cylinder for varying the volume thereof, said engine also including a rotatable crankshaft and a rotatable camshaft driven in timed relation with the speed of said crankshaft and linkage means for transmitting reciprocating movement to said valve, and said mechanism comprising a cam member on said camshaft and contoured to provide a predetermined timing for said valve such as will provide optimum performance and efficiency of said engine throughout one operating speed range, follower means engageable with said cam member and said linkage means for varying said predetermined timing of said valve, said follower means having a control surface engaging said cam member and another surface adapted to engage said linkage means, said control and other surfaces each including first and second contiguous, curved portions, and operating means connected to said follower means for shifting the latter throughout a range of positions such as to vary said predetermined timing while said control surface is engaged with said cam member and said other surface is engaged with said linkage means.

2. The mechanism of claim 1, in which said first position of said control and other surface is of decreasing radius and said second portion of said control and other surface is of decreasing radius.

3. The mechanism of claim 2, in which said follower means comprises an elongated member of substantially uniform thickness at least between said first and second portions.

4. The mechanism of claim 3, in which said elongated member has proximal and distal ends, said first portion of said control surface extends substantially from said proximal end toward said distal end, said second portion extends substantially from said first portion to said distal end.

5. The mechanism of claim 4, in which the radius of curvature of at least said first portion of said control surface is such that the period during which said valve remains open is of relatively short duration when substantially only the first portion of said control surface is operative.

6. The mechanism of claim 5, in which the radius of curvature of at least said second portion of said control surface is such that the period during which said valve remains open is of relatively long duration when substantially equal parts of said first and second portions of said control surface are operative.

7. The mechanism of claim 4, in which said operating means effects movement of the proximal end of said elongated member along an arcuate path throughout the range of positions of said elongated member.

8. The mechanism of claim 7, in which said operating means comprises a control shaft mounted for rotation about an axis that extends substantially parallel to the axis of said camshaft, a crank is connected at one end to said control shaft, and the other end of said crank is connected to the proximal end of said elongated member, whereby rotation of said control shaft in opposite directions throughout a predetermined range of angular positions effects movement of said elongated member throughout said range of positions.

9. The mechanism of claim 8, in which the proximal end of said elongated member is bifurcated and said other end of said crank is disposed between and pivotally connected to the bifurcated portions of said proximal end of said link.

10. The mechanism of claim 9, in which the angle through which said crank swings while shifting said elongated member throughout its range of operation positions is about 75°.

11. The mechanism of claim 1, in which said follower means comprises an elongated member, and spring means is provided for engaging said elongated member and holding the control surface thereof engaged with said cam member.

12. The mechanism of claim 11, in which said spring means is generally U-shaped and includes a pair of laterally spaced, generally parallel legs and a connecting portion extending perpendicularly to said legs, said connecting portion engages the other surface of said elongated member, and the legs of said spring means are laterally spaced from each other by an amount sufficient to accommodate said elongated member therebetween.

13. The mechanism of claim 12, in which the ends of the legs of said spring means are secured in bosses carried on laterally spaced flanges extending perpendicularly to said control shaft.

* * * * *